US012263126B2

(12) United States Patent
Van Loon et al.

(10) Patent No.: US 12,263,126 B2
(45) Date of Patent: Apr. 1, 2025

(54) PROTECTIVE SYSTEM FOR A PATIENT TRANSPORT APPARATUS

(71) Applicant: Stryker Corporation, Kalamazoo, MI (US)

(72) Inventors: Mackenzie Van Loon, Mattawan, MI (US); Hieu Phan, Portage, MI (US); James K. Galer, Byron Center, MI (US)

(73) Assignee: Stryker Corporation, Portage, MI (US)

( * ) Notice: Subject to any disclaimer, the term of this patent is extended or adjusted under 35 U.S.C. 154(b) by 190 days.

(21) Appl. No.: 18/191,356

(22) Filed: Mar. 28, 2023

(65) Prior Publication Data

US 2024/0041673 A1 Feb. 8, 2024

Related U.S. Application Data

(60) Provisional application No. 63/395,014, filed on Aug. 4, 2022.

(51) Int. Cl.
*A61G 1/04* (2006.01)
*A47C 31/10* (2006.01)
(Continued)

(52) U.S. Cl.
CPC .............. *A61G 1/04* (2013.01); *A47C 31/113* (2013.01); *A47C 31/116* (2013.01);
(Continued)

(58) Field of Classification Search
CPC ........ A61G 1/04; A61G 1/01; A61G 2203/70; A47C 27/005; A47C 27/006;
(Continued)

(56) References Cited

U.S. PATENT DOCUMENTS 1,877,610 A * 9/1932 Steiner ................. A61G 7/0502 108/90
1,967,422 A * 7/1934 Nadelson ............. A61G 7/0502 5/618

(Continued)

FOREIGN PATENT DOCUMENTS

WO 2021211781 A1 10/2021

OTHER PUBLICATIONS

Teton Sports, "Oasis 22L Hydration Pack with 3L Bladder", https://tetonsports.com/products/oasis-221-hydration-pack, 2023, 16 pages.

*Primary Examiner* — Robert G Santos
(74) *Attorney, Agent, or Firm* — Howard & Howard Attorneys PLLC

(57) ABSTRACT

A protective system for a patient transport apparatus includes the patient transport apparatus with a base arranged for movement along floor surfaces and an intermediate frame coupled to the base and supporting a patient support deck. A mattress is disposed on the patient support deck. The protective system further includes a keeper coupled to the intermediate frame and further includes a cover having a first side configured to absorb fluid and a second side configured to at least partially limit fluid from transferring through the cover towards the first side. The cover is movable by a caregiver between three positions: (i) a stowed position secured within the keeper, (ii) an environmental deployed position with the first side facing towards the mattress, and (iii) a patient deployed position with the first side facing away from the mattress.

20 Claims, 9 Drawing Sheets

(51) Int. Cl.
*A47C 31/11* (2006.01)
*A47G 9/02* (2006.01)
*A61G 1/01* (2006.01)

(52) U.S. Cl.
CPC .......... *A47G 9/0238* (2013.01); *A47C 31/105* (2013.01); *A47G 9/02* (2013.01); *A61G 1/01* (2013.01); *A61G 2203/70* (2013.01)

(58) Field of Classification Search
CPC ... A47C 27/007; A47C 31/105; A47C 31/113; A47C 31/116; A47G 9/0238; A47G 9/02
USPC ............ 5/625, 600, 482, 484, 500, 502, 663
See application file for complete search history.

(56) References Cited

U.S. PATENT DOCUMENTS

| | | | | | |
|---|---|---|---|---|---|
| 3,344,444 | A | * | 10/1967 | McNeal | A47C 21/028 5/488 |
| 3,466,679 | A | * | 9/1969 | Hess | A47C 21/028 5/488 |
| 3,591,875 | A | * | 7/1971 | Zipf, III | A47C 31/105 5/500 |
| 3,612,509 | A | * | 10/1971 | Boston | A61G 7/1098 269/98 |
| 3,641,600 | A | * | 2/1972 | Oats | A47C 21/028 297/222 |
| 3,761,973 | A | * | 10/1973 | Leventhal | A61F 5/485 5/487 |
| 3,956,782 | A | * | 5/1976 | Morrison | A61G 7/0502 5/737 |
| 4,025,973 | A | * | 5/1977 | Walbrecht | A47C 19/022 5/488 |
| 4,278,719 | A | * | 7/1981 | Sarnecki | A47K 10/02 428/95 |
| 4,358,865 | A | * | 11/1982 | Pagel | A47G 9/0238 428/910 |
| 4,627,426 | A | * | 12/1986 | Wegener | A61B 46/00 128/849 |
| 4,704,753 | A | * | 11/1987 | Lunt | A47G 9/0246 5/502 |
| 5,084,927 | A | * | 2/1992 | Parkevich | A47G 9/02 5/939 |
| 5,718,009 | A | * | 2/1998 | Lin | A47C 21/028 5/498 |
| 6,381,778 | B1 | * | 5/2002 | Peterson | A47G 9/0246 5/500 |
| 7,120,952 | B1 | * | 10/2006 | Bass | A47C 31/105 5/500 |
| 7,398,571 | B2 | | 7/2008 | Souke et al. | |
| 10,987,268 | B2 | | 4/2021 | Souke et al. | |
| 11,147,400 | B1 | * | 10/2021 | Gorea | A61G 7/0502 |
| 11,766,369 | B1 | * | 9/2023 | Dillon | A61F 7/106 5/497 |
| 2011/0214233 | A1 | * | 9/2011 | Stang | A47G 9/0238 428/57 |
| 2021/0186781 | A1 | | 6/2021 | Souke et al. | |
| 2024/0041673 | A1 | * | 2/2024 | Van Loon | A61G 1/01 |

* cited by examiner

FIG. 14
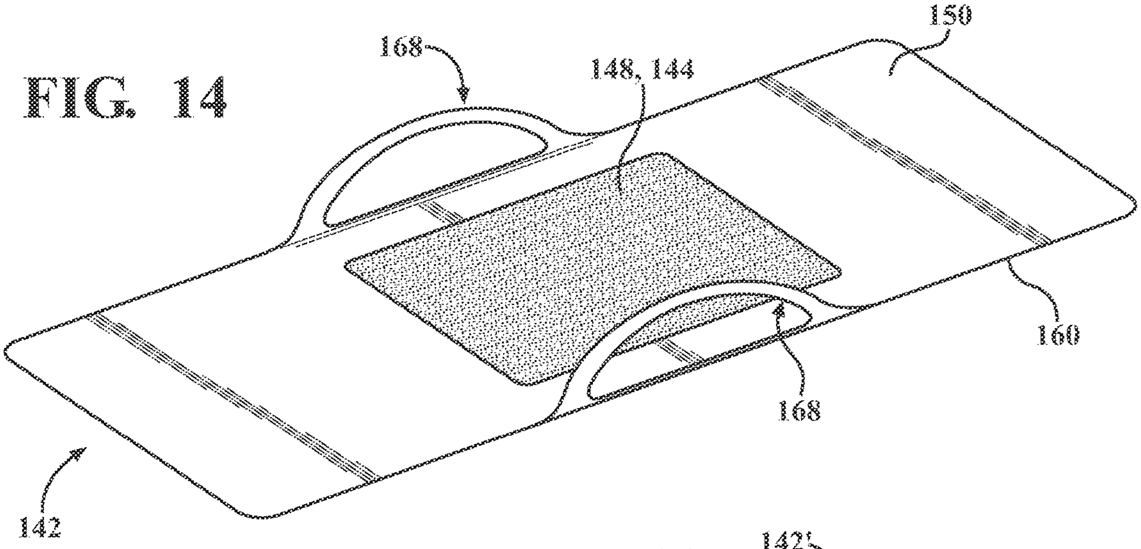
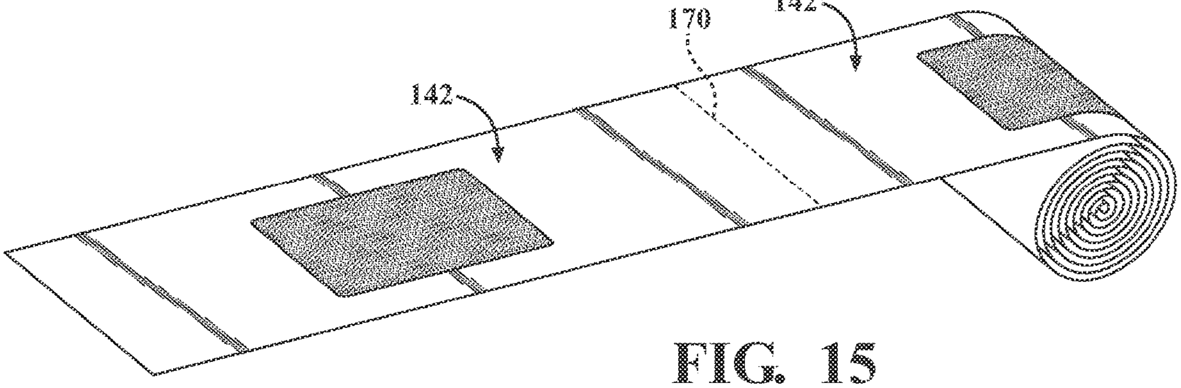
FIG. 15
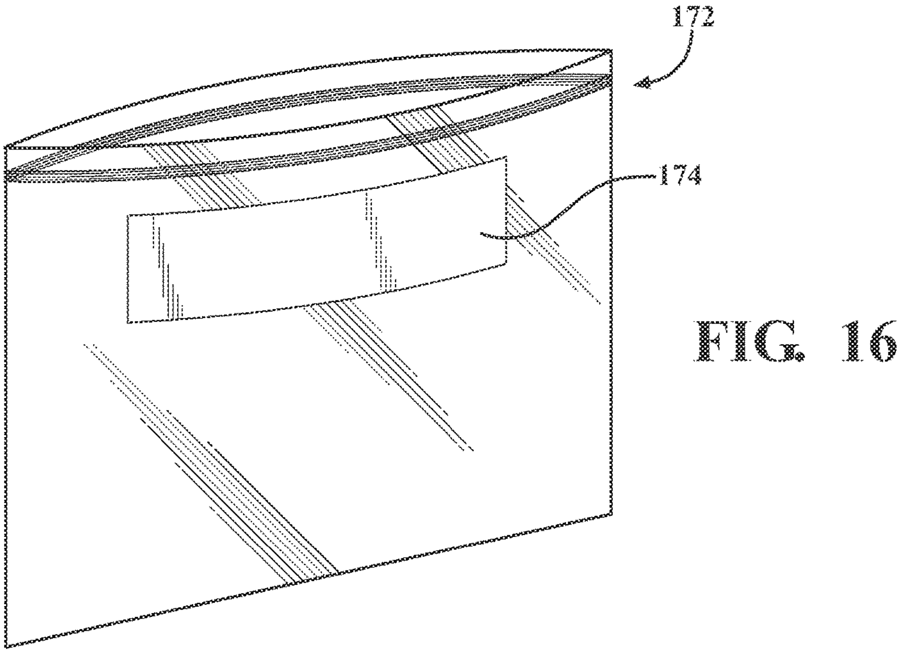
FIG. 16

PROTECTIVE SYSTEM FOR A PATIENT TRANSPORT APPARATUS

CROSS-REFERENCE TO RELATED APPLICATION

The subject patent application claims priority to and all the benefits of United States Provisional Patent Application No. 63/395,014 filed on Aug. 4, 2022, the disclosure of which is hereby incorporated by reference in its entirety.

BACKGROUND

Patient support systems facilitate care of patients in a health care setting. Patient support systems comprise patient transport apparatuses such as, for example, hospital beds, stretchers, cots, tables, wheelchairs, and chairs. In certain situations (such as first response scenarios) caregivers must travel to the patient and transport the patient back to an emergency medical facility.

Depending on the scenario, caregivers may also require the use of medical equipment (e.g. a heart monitor, defibrillator, and the like) to facilitate the care of the patient. Meeting the patient at the first point of care often requires the caregiver to expose a patient transport apparatus, such as a cot, to the outside environment and adverse weather conditions (e.g. rain). The adverse weather conditions may consequently expose the patient transport apparatus and the medical equipment to fluids. Similarly, depending on the nature of the patient's medical needs, the patient's body may also expose the patient transport apparatus and the medical equipment to fluids, such as blood or other bodily fluids. Thus, there remains an opportunity to develop a system for protecting the patient transport apparatus and associated medical equipment from fluids originating from the environment and/or the patient.

SUMMARY

The present disclosure provides a protective system for a patient transport apparatus. The protective system includes a patient transport apparatus. The patient transport apparatus includes a base arranged for movement along floor surfaces and an intermediate frame coupled to the base and supporting a patient support deck. A mattress is disposed on the patient support deck. The protective system further includes a keeper coupled to the intermediate frame. The protective system further includes a cover for protecting the patient transport apparatus. The cover has a first side configured to absorb fluid. The cover also has a second side, opposite the first side, configured to at least partially limit fluid from transferring through the cover towards the first side. The cover is movable by a caregiver between three positions: (i) a stowed position secured within the keeper, (ii) an environmental deployed position defined by the cover spanning at least a portion of the mattress with the first side facing towards the mattress and the second side facing away from the mattress to at least partially limit fluid from transferring through the cover towards the mattress and prevent absorption of the fluid by the first side of the cover, and (iii) a patient deployed position defined by the cover spanning at least a portion of the mattress with the first side facing away from the mattress and the second side facing towards the mattress for collecting fluid emitted by the patient.

BRIEF DESCRIPTION OF THE DRAWINGS

Advantages of the present disclosure will be readily appreciated as the same becomes better understood by reference to the following detailed description when considered in connection with the accompanying drawings.

FIG. 14 is a perspective view of an aspect of the cover including sleeves shaped to receive siderails of the patient transport apparatus to limit movement of the cover relative to the patient transport apparatus.

FIG. 15 is a perspective view of an aspect of the cover removably coupled to a second cover at a perforated boundary.

FIG. 16 is a perspective view of a bag for storing belongings of the patient and for use with the protective system.

DETAILED DESCRIPTION

Figure 1:
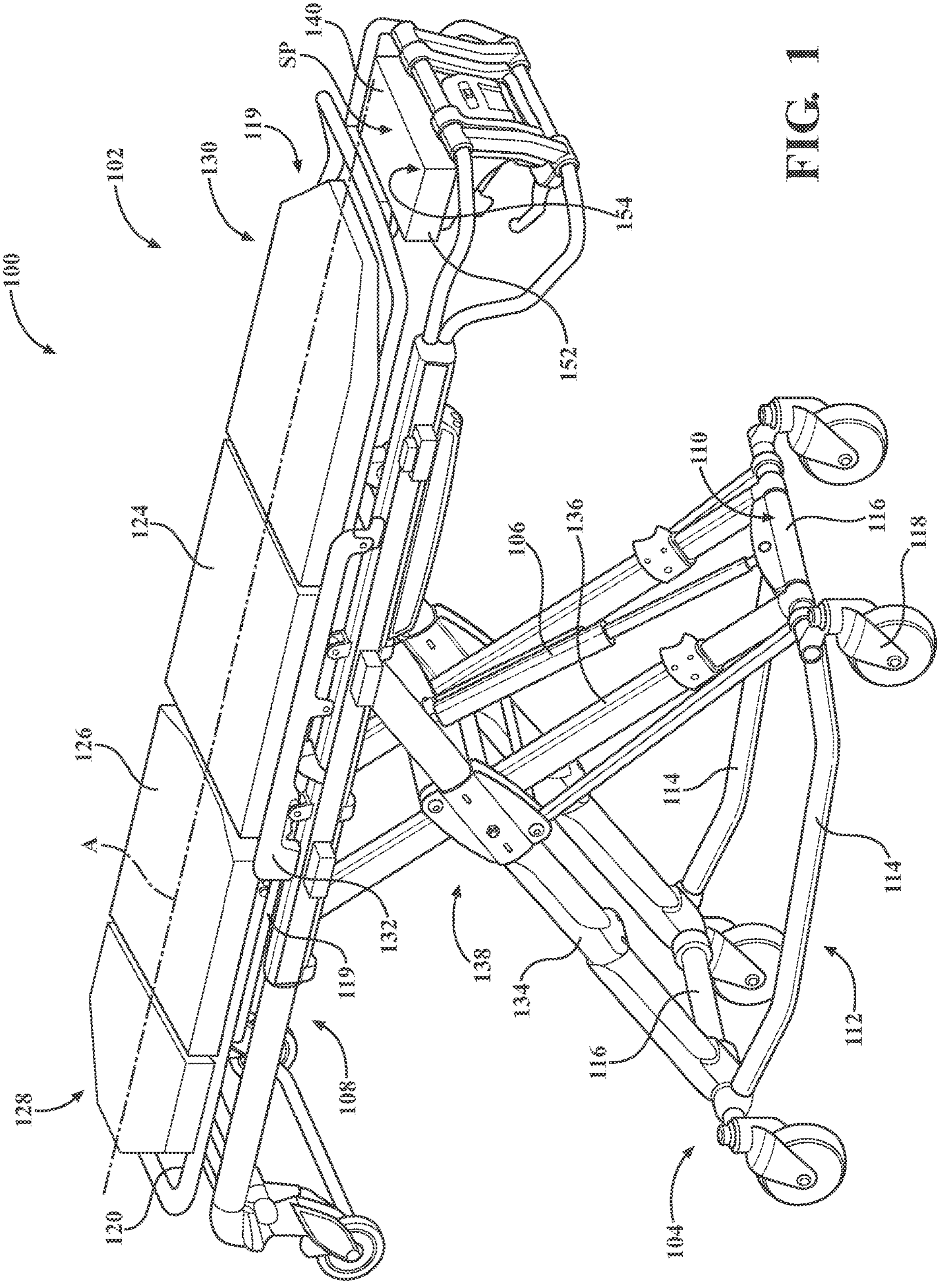
FIG. 1 is a perspective view of one aspect of a protective system having a cover in a stowed position secured within a keeper located at a foot end of a patient transport apparatus.
Figure 2:
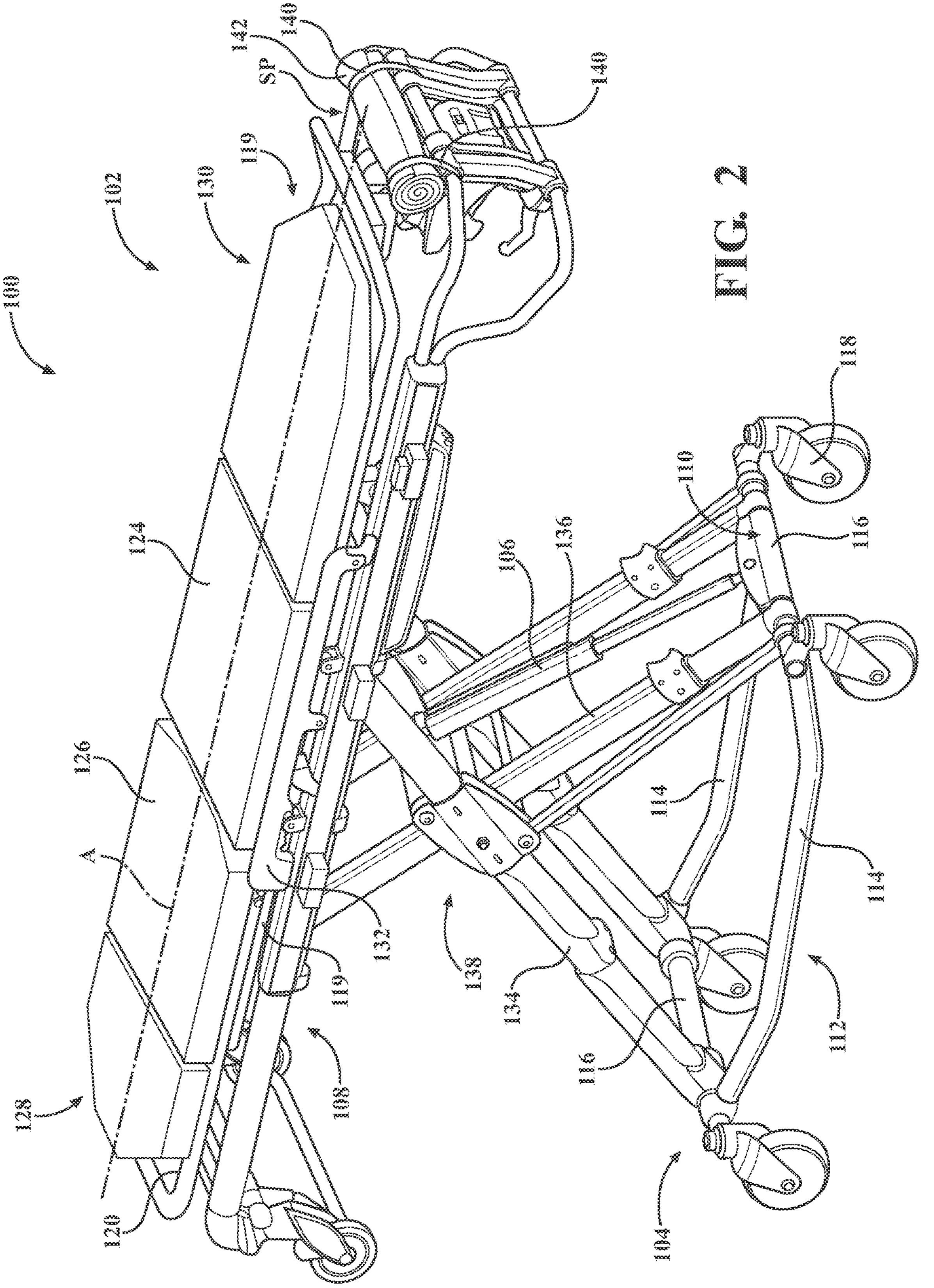
FIG. 2 is a perspective view of another aspect of the protective system having the cover in the stowed position secured within the keeper located at the foot end of the patient transport apparatus.
Figure 3:
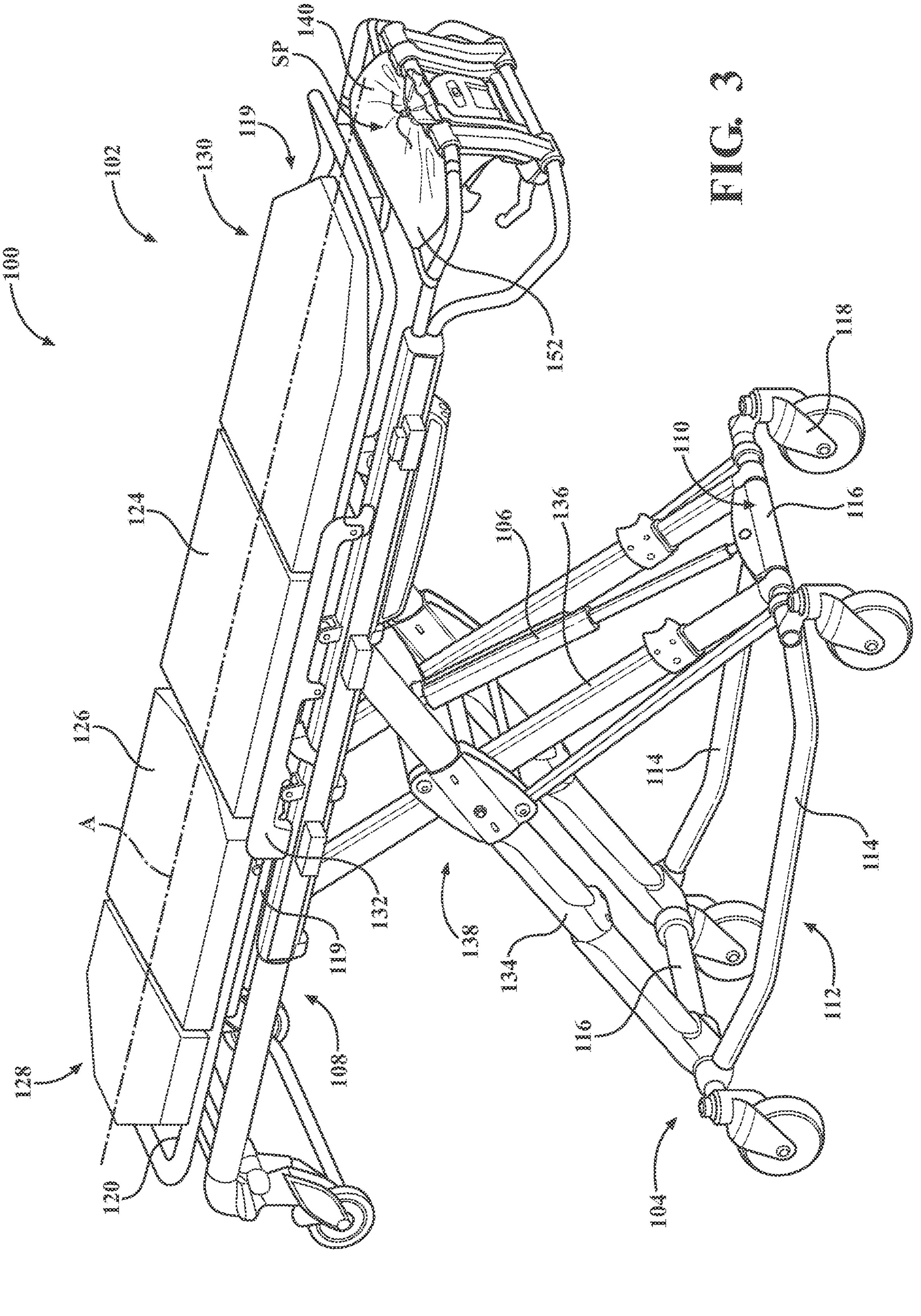
FIG. 3 is a perspective view of another aspect of the protective system having the cover in the stowed position secured within the keeper located at the foot end of the patient transport apparatus.

Referring to FIGS. 1-3, a protective system 100 for a patient transport apparatus 102 is illustrated. The patient transport apparatus 102 facilitates transportation of a patient in a health care and/or transportation setting. The patient transport apparatus 102 illustrated in FIGS. 1-3 is realized as a cot. In other versions, however, the patient transport apparatus 102 may be a hospital bed, a stretcher, and/or a similar apparatus utilized in the transportation and/or care of a patient such as a movable chair (e.g. wheelchair or evacuation chair). Other configurations are contemplated.

As shown in FIGS. 1-3, the patient transport apparatus 102 generally includes a base 104 arranged for movement along floor surfaces. A lift mechanism 106 may couple the base 104 to an intermediate frame 108. The base 104 may include two opposing lateral base sides 110 coupled to two opposing longitudinal base sides 112. The longitudinal base sides 112 may include longitudinally-extending rails 114 and the lateral base sides 110 may include crosswise-extending rails 116 which may be coupled at the ends thereof to the longitudinally-extending rails 114.

The base 104 may further include a plurality of caster wheel assemblies 118 operatively connected adjacent to each corner of the base 104 defined by the longitudinally-extending rails 114 and the crosswise-extending rails 116. As such, the patient transport apparatus 102 of FIGS. 1-3 may include four caster wheel assemblies 118. The wheel assemblies 118 may be configured to swivel to facilitate turning of the patient transport apparatus 102. The wheel assemblies 118 may include a swivel locking mechanism to prevent the wheel assemblies 118 from swiveling when engaged. The wheel assemblies 118 may also include wheel brakes to prevent rotation of the wheel.

The patient transport apparatus 102 includes the intermediate frame 108 coupled to the base 104 and defining a patient support deck 119 for supporting a patient on a patient support surface 120. The intermediate frame 108 can be like that shown in U.S. Pat. No. 10,987,268 B2, which claims priority to U.S. Provisional Patent Application No. 62/488,441, filed on Apr. 21, 2017, entitled, "Emergency Cot with A Litter Height Adjustment Mechanism," the disclosures of which are hereby incorporated by reference in their entirety.

Referring still to FIGS. 1-3, a mattress 124 is disposed on the patient support deck 119. The mattress 124 includes a secondary patient support surface 126 upon which the patient is supported. The base 104, intermediate frame 108, patient support deck 119, and patient support surfaces 120, 126 each have a head end 128 and a foot end 130 corresponding to the designated placement of the patient's head and feet on the patient transport apparatus 102. The construction of the mattress 124 is not particularly limiting. Specifically, the mattress 124 may take on any known or conventional design and is not limited to the structure shown throughout the FIGS. 1-3. In addition, the mattress 124 may be omitted in certain versions, such that the patient rests directly on the patient support surface 120. In alternative aspects, when the patient transport apparatus 120 is a chair like structure, the mattress 124 may be more commonly referred to as a pad that is disposed over a seat and back region.

The intermediate frame 108 may extend longitudinally along a longitudinal axis A between a head end 128 and a foot end 130. The intermediate frame 108 may further extend laterally along a lateral axis (not shown in detail) between a left side and a right side. The left side and right side. The intermediate frame 108 may be coupled to a variety of components that aid in supporting and/or transporting the patient. The patient support deck 119 may be defined by one or more articulable deck sections, for example, a fowler deck section, a seat deck section, and a leg deck section to facilitate care and/or transportation of the patient in various patient positions.

The intermediate frame 108 may also be coupled to a pair of opposing lateral siderails 132 or side boards. More specifically, a left siderail coupled to the left side of the intermediate frame 108 and a right siderail may be coupled to a right side of the intermediate frame 108. The siderails 132 extend from opposing sides of the intermediate frame 108 and provide egress barriers for the patient on the patient support deck 119. The siderails 132 may also be utilized by an individual, such as a caregiver, an emergency medical technician (EMT), or another medical professional, to move or manipulate the patient transport apparatus 102. In some versions, the siderails 132 may include a hinge, pivot, or similar mechanism to allow the siderails 132 to be folded or stored adjacent to or below the patient support deck 119.

One of the siderails 132 may be disposed along one of the lateral sides and the other one of the siderails 132 may be disposed along the other one of the lateral sides. More specifically, a left siderail may be coupled to the left side of the intermediate frame 108 and a right siderail may be coupled to a right side of the intermediate frame 108. The pair of siderails 132 may be configured to retain the patient between the siderails 132 on the patient support deck 119. More specifically, the patient may be positioned between the pair of siderails 132, with the pair of siderails 132 engaging the patient to prevent inadvertent movement of the patient laterally off of the patient support deck 119 (e.g., during transport).

The patient transport apparatus 102 may also include the lift mechanism 106 interposed between the base 104 and the intermediate frame 108. The lift mechanism 106 may be configured to move between a plurality of vertical configurations including one or more extended configurations, where the intermediate frame 108 is elevated relative to the base 104, as shown in FIG. 1, and one or more retracted configurations (e.g., a maximum lowered configuration; not shown) where the intermediate frame 108 is lowered such that it is in closer proximity to the base 104. The lift mechanism 106 can be like that shown in the U.S. Pat. No. 10,987,268 B2, previously referenced. However, other configurations are contemplated.

While moving between the plurality of vertical configurations, the lift mechanism 106 may move either the base 104 or the intermediate frame 108 relative to the other of the intermediate frame 108 or the base 104 depending on how the patient transport apparatus 102 is supported during use. For example, the patient transport apparatus 102 may be supported at the intermediate frame 108 when the patient transport apparatus 102 is being unloaded/loaded into an emergency response vehicle (not shown) and the patient transport apparatus 102 may be supported at the base 104 when the patient transport apparatus 102 is resting on a surface. In instances where the patient transport apparatus 102 is supported at the intermediate frame 108, the lift mechanism 106, while moving between the plurality of vertical configurations, moves the base 104 relative to the intermediate frame 108. In instances where the patient transport apparatus 102 is supported at the base 104, the lift mechanism 106, while moving between the plurality of vertical configurations, moves the intermediate frame 108 relative to the base 104.

The pair of siderails 132 may be pivotable independently of one another between respective first and second positions. As such, one of the pair of siderails may be in the second position to permit ingress/egress of the patient to the patient support deck 119, while the other one of the pair of siderails 132 may be in the first position, which may engage the patient after the patient is placed on the patient support deck 119 (e.g., the other siderails 132 in the first position extend the patient support deck 119 and may present a stop to prevent accidentally pushing the patient off of the patient support deck 119.) However, the pair of siderails 132 may both be simultaneously disposed in either of the first or second positions, and/or to various positions therebetween. In some versions, adjustment of the pair of siderails 132 between the positions may be employed to accommodate patients of different body types or sizes (e.g., bariatric patients). Other configurations are contemplated.

The lift mechanism 106 includes a first frame member 134 and a second frame member 136, both of which are coupled to the intermediate frame 108 and the base 104. A first end of the second frame member 136 may be pivotally coupled to the head end 128 of the intermediate frame 108 at a connection point such that the second frame member 136 may pivot about the connection point. A second end of the second frame member 136 may be pivotally coupled to a foot end 130 of the base 104 at a connection point such that the second frame member 136 may pivot about the connection point. Furthermore, a first end of the first frame member 134 may be pivotally coupled to a foot end 130 of the intermediate frame 108 via a slidable member.

As such, the first frame member 134 is pivotally coupled to the intermediate frame 108 and may pivot about the slidable member. Also shown, a second end of the first frame member 134 may be pivotally coupled to the head end 128 of the base 104 at a connection point such that the first frame member 134 may pivot about the connection point. Furthermore, the first frame member 134 and the second frame member 136 may be pivotally coupled to each other at the pivot axle to form an "X" frame 138.

The lift mechanism 106 may include a second, similarly constructed X frame 138, which may include a third frame member and a fourth frame member. Similar to X frame 138, the third frame member and the fourth frame member may be pivotally coupled to a side of the intermediate frame 108 and a side of the base 104. For example, the third frame member and the fourth frame member of X frame 138 may be pivotally coupled to a side of the intermediate frame 108 and a side of the base 104, which oppose a side of the intermediate frame 108 and a side of the base 104 to which the first frame member 134 and the second frame member 136 are coupled. It will be appreciated that any reference herein to the first frame member 134 may also be a reference to the third frame member. Similarly, any reference to the second frame member 136 may also be a reference to the fourth frame member.

In FIGS. 1-3, the frame members 134, 136 are hollow and slidably support further frame members (not shown in detail) which may be supported for movement into and out of the respective frame members 134, 136 to extend a length of the respective frame members. In the version shown in FIGS. 1-3, the further frame members extend out of frame members 134, 136 toward the base 104. However, in other examples, the further frame members may extend out of frame members 134, 136 toward the intermediate frame 108. In these examples, frame members 134, 136 are coupled to the base 104 or the intermediate frame 108 via the further frame members. However, in other examples, the frame members 134, 136 may be of a fixed length and exclude further frame members. Additionally, while the lift mechanism 106 of the representative version illustrated in FIGS. 1-3 includes four frame members, the lift mechanism 106 may include any suitable number of frame members.

Those having ordinary skill in the art will appreciate that the lift mechanism 106 may move between the plurality of vertical configurations due to a patient care provider applying a manual action to the lift mechanism 106, or components thereof. Additionally, or alternatively, the patient transport apparatus 102 may include one or more actuators, which may be coupled to any suitable component of the lift mechanism 106 and may be configured to move the lift mechanism 106 between the plurality of vertical configurations. As shown in FIG. 1, the illustrated actuator is realized as a hydraulic linear actuator, which is connected to and extends between the base 104 and the intermediate frame 108. In this particular version, the hydraulic linear actuator includes a cylindrical housing fastened to intermediate frame 108, the cylindrical housing including a reciprocal rod having a piston (not shown) located within the cylindrical housing. The distal end of the reciprocal rod is connected by a joint to the base 104. The joint allows pivotal movement about two orthogonally related axes. Extension and retraction of the reciprocal rod will facilitate movement of the frame members 134, 136 of the lift mechanism 106 about the axis of the reciprocal rod.

The actuator is further described in U.S. Pat. No. 7,398,571, filed on Jun. 30, 2005, entitled, "Ambulance Cot and Hydraulic Elevating Mechanism Therefor," the disclosure of which is hereby incorporated by reference in its entirety. Furthermore, techniques for utilizing the actuator to manipulate the components of the patient transport apparatus 102 can be like those described in U.S. Pat. No. 10,987,268 B2, previously referenced. Other configurations are contemplated.

In some versions, the actuator may not be the hydraulic linear actuator shown in FIG. 1. The actuator may be any actuator suitable for actuating the lift mechanism 106 such that the lift mechanism 106 moves between the plurality of vertical configurations. For example, the actuator may be an electric motor, a servo motor, a pneumatic actuator, or any other suitable actuator.

As shown throughout FIGS. 1-3, the protective system 100 further includes a keeper 140 coupled to the intermediate frame 108. In some versions, the keeper 140 is coupled to the intermediate frame 108 at the foot end 130 of the patient transport apparatus 102. However, as is shown throughout FIGS. 1-3, the geometric configuration of the keeper 140 is not limited, and it will be appreciated that the keeper 140 could be of various styles, types, and/or arrangements and may be operatively attached to different portions of the patient transport apparatus 102.

Figure 8:
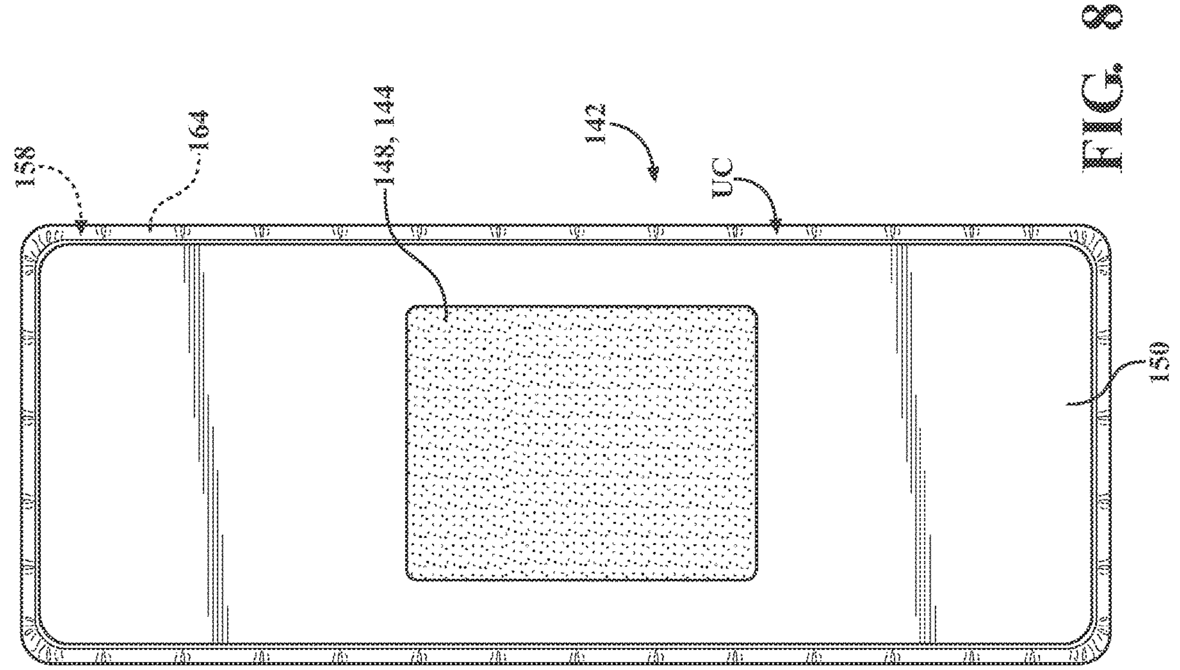
FIG. 8 is a top view of an aspect of the cover with the retainer including a band extending around the periphery of the cover.
Figure 10:
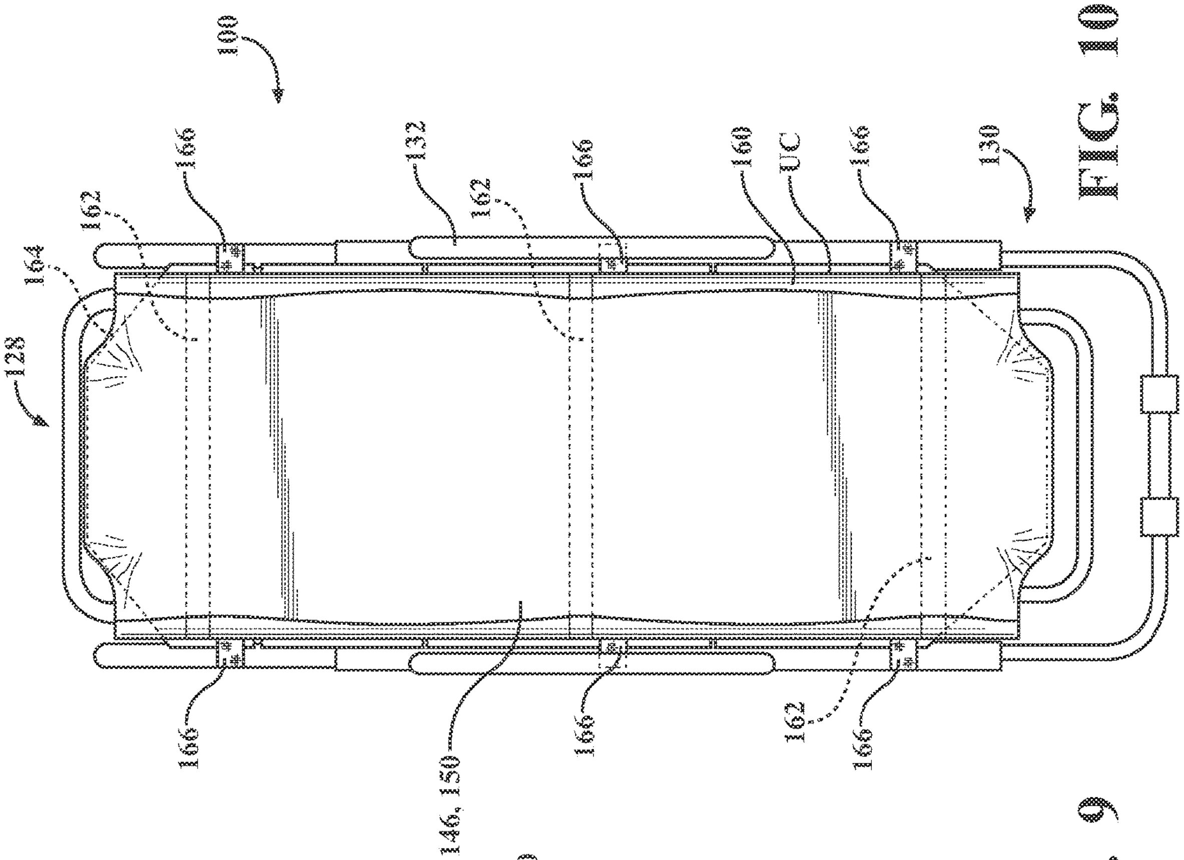
FIG. 10 is a top view of an aspect of the protective system showing the second side of the cover including the retainer, with the retainer including three bands (shown in phantom) extending laterally through the cover and extending around the periphery of the cover and including straps for securing the cover to the patient transport apparatus.
Figure 9:
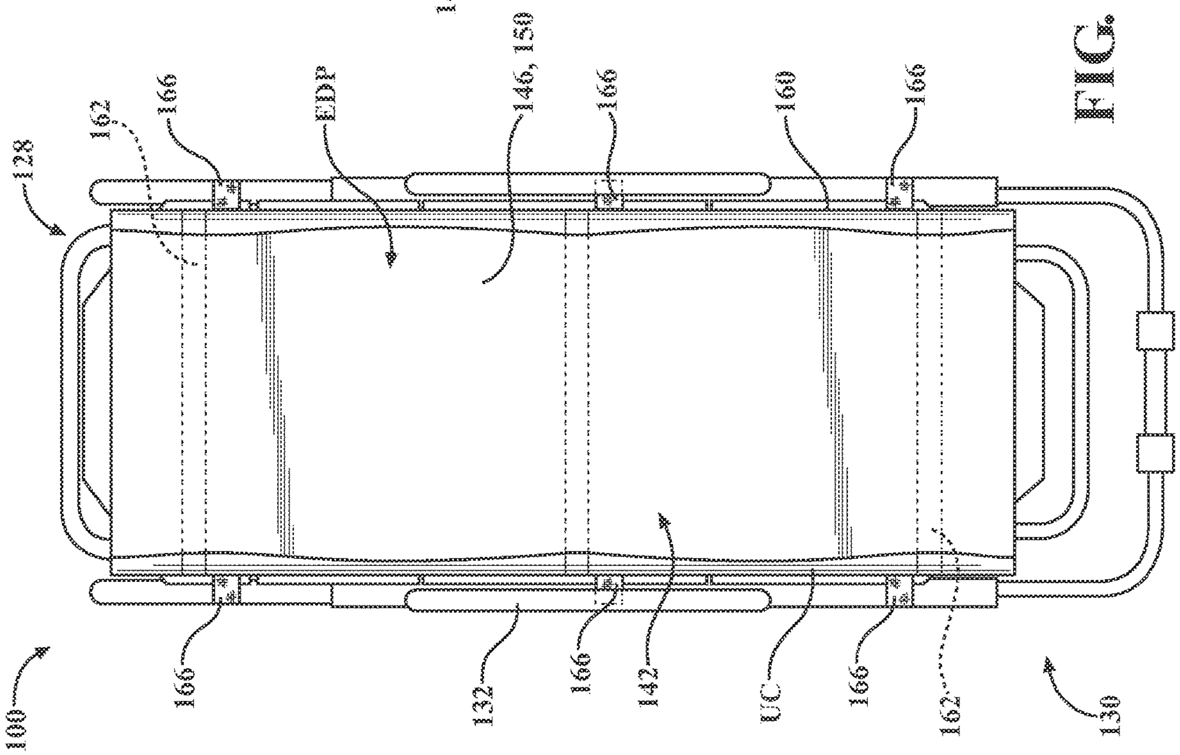
FIG. 9 is a top view of an aspect of the protective system showing the second side of the cover including the retainer, with the retainer including three bands (shown in phantom) extending laterally through the cover for orienting a portion of the periphery of the cover upward to retain fluid and including straps for securing the cover to the patient transport apparatus.
Figure 11:
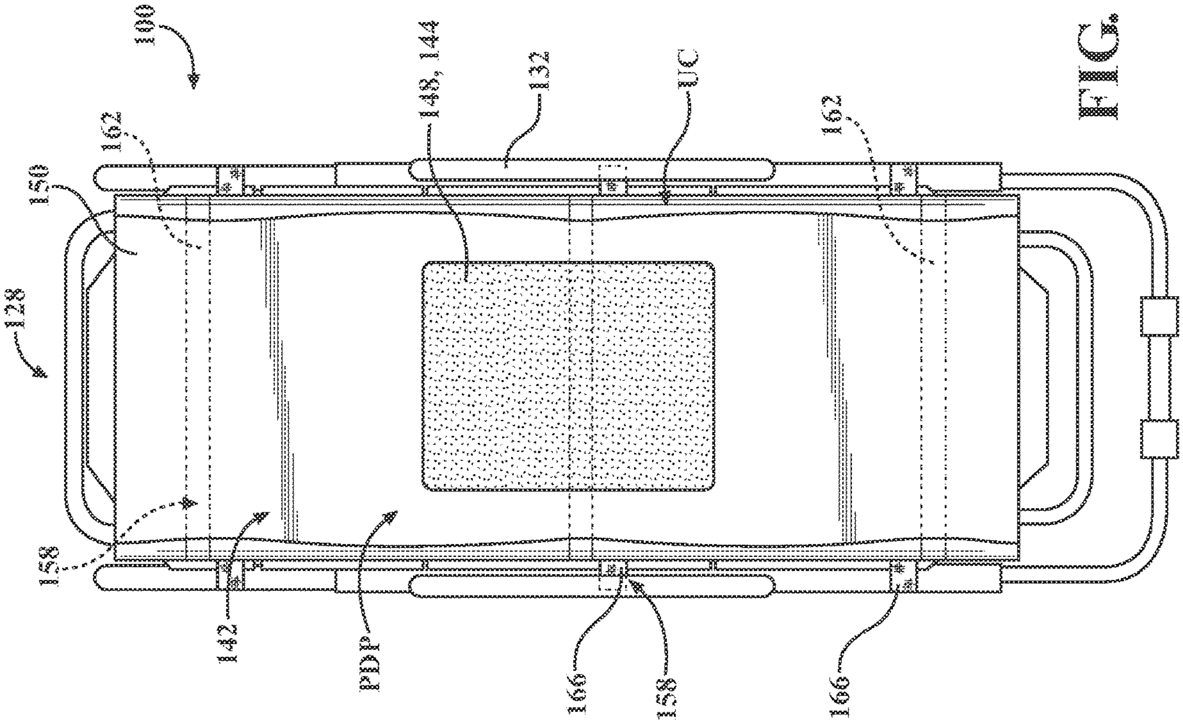
FIG. 11 is a top view of an aspect of the protective system showing the first side of the cover including the retainer, with the retainer including three bands (shown in phantom) extending laterally through the cover for orienting the periphery of the cover upward to retain fluid and including straps for securing the cover to the patient transport apparatus.

As best shown in FIGS. 9-11, the protective system 100 also includes a cover 142 for protecting the patient transport apparatus 102 and associated medical equipment (e.g., heart monitors, defibrillators, trauma kits, and the like; not shown). As best shown in FIGS. 4-8, the cover 142 has a first side 144 configured to absorb fluid. In general, fluid absorbed by the first side 144 of the cover 142 may be realized by water or a bodily fluid such as blood, sweat, urine, and the like. For the purposes of this disclosure, the term "fluid" is intended to mean liquids rather than both liquid and gasses. The cover 142 also includes a second side 146, opposite the first side 144, configured to at least partially limit fluid from transferring through the cover 142 towards the first side 144.

Figure 4:
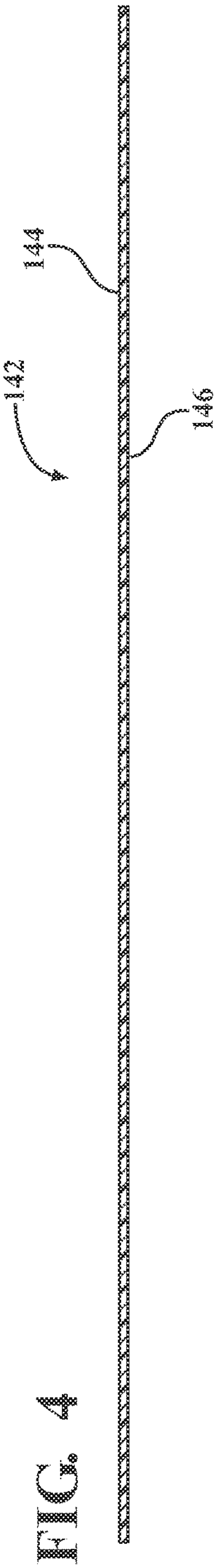
FIG. 4 is a cross-sectional view of an aspect of the cover.

The configuration of the cover 142 is not particularly limited provided the first side 144 is configured to absorb fluid and the second side 146 is configured to at least partially limit fluid from transferring through the cover 142 towards the first side 144. In generally, the second side 146 substantially (or completely) prevents fluid from transferring through the second side 146 towards the first side 144. In certain aspects, such as shown in FIG. 4, the cover 142 includes a single layer having a thickness that spaces the first and second sides 144, 146. When the cover 142 is a single layer, the first side 144 of the cover 142 may be treated to render the first side 144 hydrophobic. For example, the first side 144 may be treated with a hydrophobic coating. When the cover 142 is a single layer and the first side 144 is treated with a hydrophobic coating, the second side 146 may be naturally absorbent due to the nature of the material forming the cover 142, the porosity of the cover 142, and/or a hydrophilic surface treatment/coating applied to the second side 146.

Figure 5:
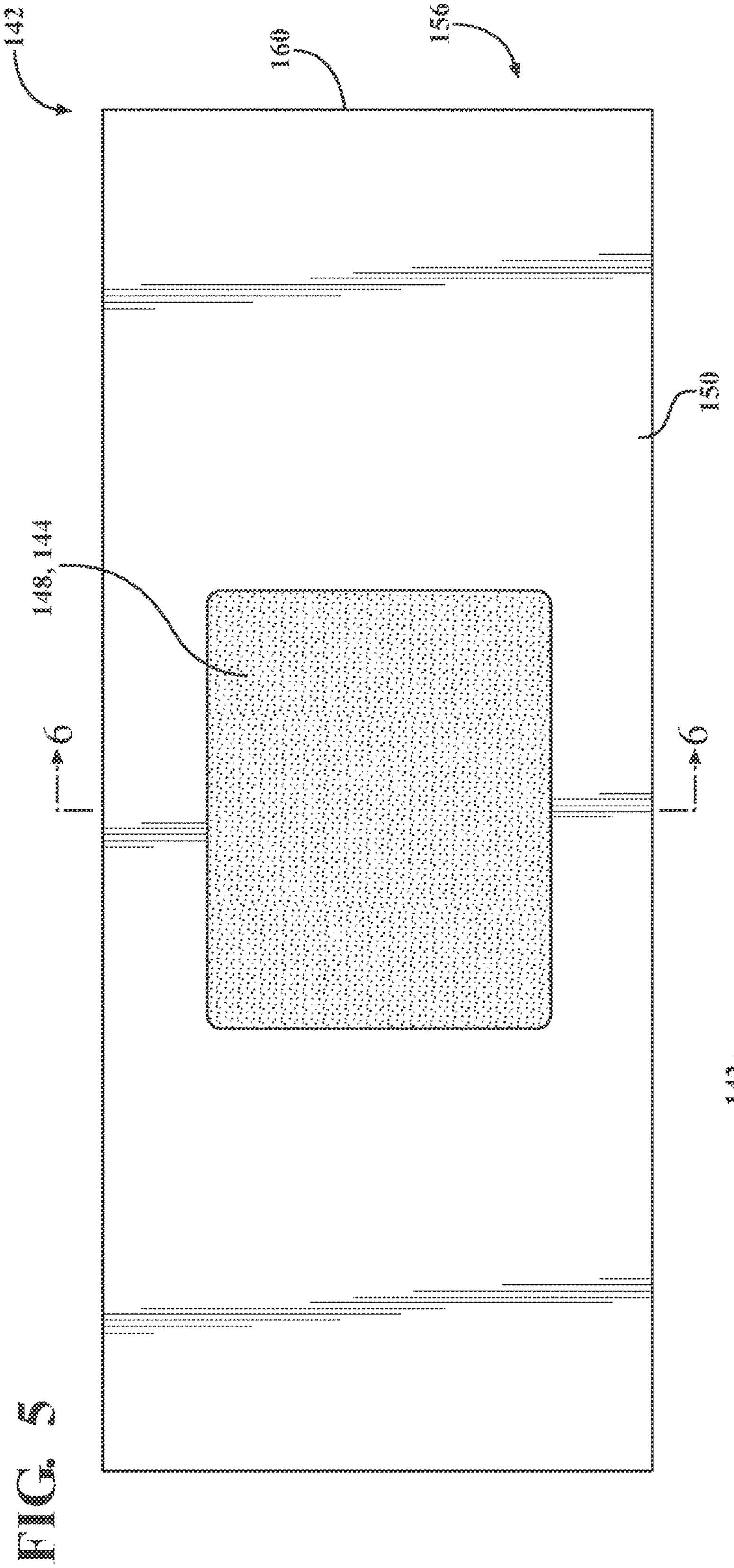
FIG. 5 is a top view of an aspect of the cover showing a first side configured to absorb fluid.
Figure 6:
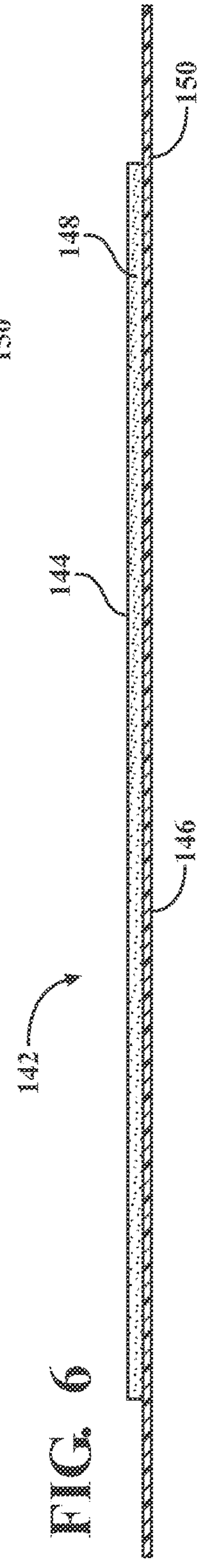
FIG. 6 is a cross-sectional view of the cover illustrated in FIG. 5 taken along 5-5.

In other aspects of the cover 142, such as shown in FIGS. 4-8, the cover 142 may include two layers with a first layer 148 presenting the first side 144 and the second layer 150 presenting the second side 146. In certain aspects, the first layer 148 and the second layer 150 are similarly sized such that it may be difficult to discern that the cover 142 includes two layers 148, 150 to an ordinary observer. In other aspects, such as shown in FIGS. 5 and 6, the first layer 148 presenting the first side 144 may be relatively smaller in size in comparison to the second layer 150. In instances when the first layer 148 is relatively smaller, the first layer 148 is generally arranged so that it is positioned relative to the lower and upper torso regions of a patient when the cover 142 is secured to the patient transport apparatus 102 (described further below). In other words, the first layer 148 is positioned such that the first layer 148 is located about the regions of the patient most likely to release fluid. Although surface treatments may be used in combination with the first and second layers 148, 150, more commonly, the first and second layers 148, 150 themselves are formed from a material that establishes the physical properties of the particular layer. For example, the first layer 148 may be formed from an absorbent pad and the second layer 150 may be formed from a liquid impermeable material such as GORE® Medical Fabric.

The cover 142 is movable by a caregiver between three positions: (i) a stowed position (SP) secured within the keeper 140, (ii) an environmental deployed position (EDP) defined by the cover 142 spanning at least a portion of the mattress 124 with the first side 144 facing towards the mattress 124 and the second side 146 facing away from the mattress 124 to at least partially limit fluid from transferring through the cover 142 towards the mattress 124 and prevent absorption of the fluid by the first side 144 of the cover 142, and (iii) a patient deployed position (PDP) defined by the cover 142 spanning at least a portion of the mattress 124 with the first side 144 facing away from the mattress 124 and the second side 146 facing towards the mattress 124 for collecting fluid emitted by the patient.

As shown in FIGS. 1-3, the present disclosure provides multiple aspects for securing the cover 142 in the stowed position (SP) within the keeper 140. In one aspect, as best shown in FIG. 1, the keeper 140 may resemble a box-like container that is coupled or removably coupled to the intermediate frame 108 at the foot end 130 of the patient transport apparatus 102. In this aspect, the keeper 140 includes a keeper body 152 and a limiter 154 operatively attached to the keeper body 152. The limiter 154 and the keeper 140 are configured to cooperate to limit exposure of the first side 144 of the cover 142 to fluids. The limiter 154 is operable between a limit mode to inhibit movement of the cover 142 in the stowed position (SP) and a deploy mode to permit movement of the cover 142. The limiter 154 may be straps disposed within the keeper body 152, a lid configured to pivot about the keeper body 152, or a slide that creates/exposes an opening within the keeper body 152 in a first position and seals/closes the keeper body 152 in a second position. Persons have ordinary skill in the art will readily recognize that alternative means for producing the same result (securing the cover 142 in the keeper 140) may be used.

Figure 7:
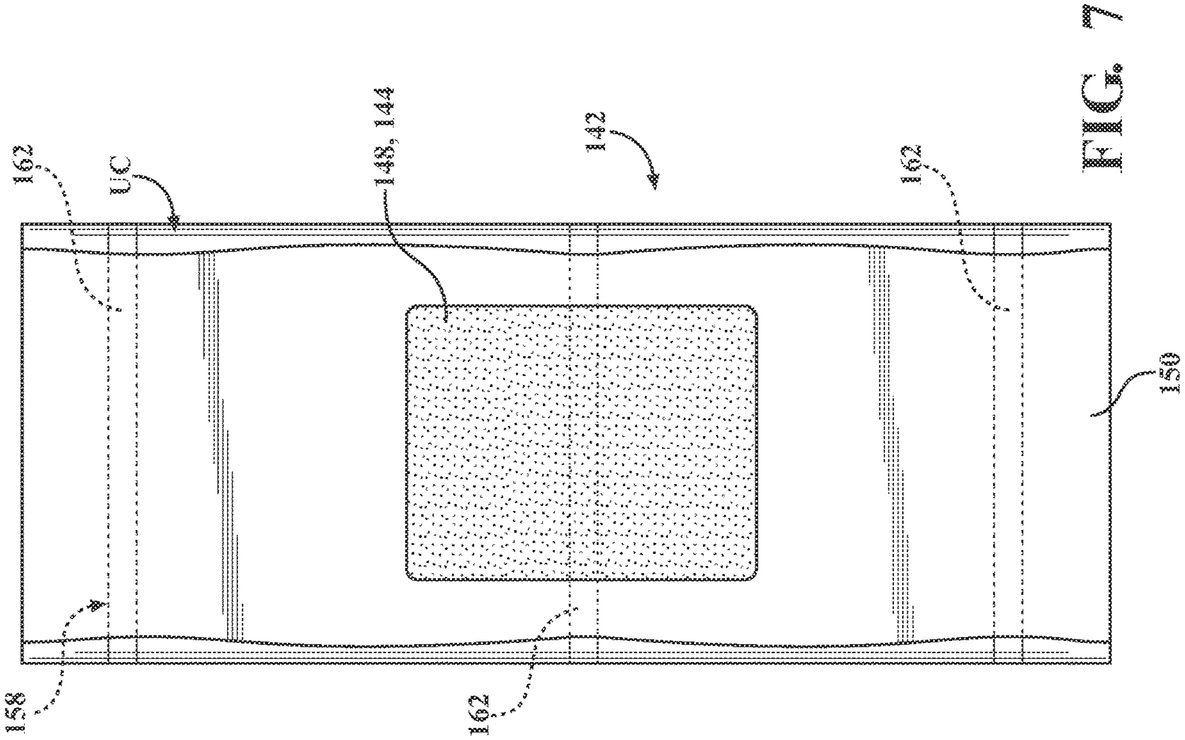
FIG. 7 is a top view of an aspect of the cover with a retainer including three bands (shown in phantom) extending laterally through the cover for orienting a portion of a periphery of the cover upward to retain fluid.

In certain aspects, the cover 142 is further defined to include a panel 156 with the panel 156 defining the first and second sides 144, 146. In these aspects, the cover 142 also includes a retainer 158 operatively attached to the panel 156 and arranged to secure the cover 142 to the patient transport apparatus 102. The retainer 158 may be used to secure the cover 142 to the patient transport apparatus 102 in the environmental deployed position (EDP), which is illustrated in FIGS. 9 and 10. Alternatively, as best shown in FIG. 11, the retainer 158 may be used to secure the cover 142 to the patient transport apparatus 102 in the patient deployed position (PDP). In one configuration of the cover 142, the panel 156 defines a panel periphery 160 with the retainer 158 operatively attached to the panel periphery 160. For example, in one configuration as best shown in FIG. 7, the retainer 158 includes one or more lateral bands 162 disposed and extending laterally within the panel 156. In addition to the lateral bands 162, or as an alternative to the lateral bands 162, the retainer 158 may include a perimeter band(s) 164 disposed within the panel 156 and extending about at least a portion of the periphery 160 of the panel 156. An aspect of the present disclosure including the perimeter band 164 around the entire periphery 160 of the panel 156 is shown in FIGS. 8 and 10. The perimeter band 164 of the retainer 158 may be employed to tightly secure the cover 142 to the mattress 124, such that the cover 142 "hugs" the mattress 124. In certain aspects, as best illustrated in FIGS. 9-11, the retainer 158 may also include straps 166 to secure the retainer 158 to the intermediate frame 108 of the patient transport apparatus 102. The straps 166 may have any configuration, such as including Velcro® or male/female snaps, to secure the cover 142 to the patient transport apparatus 102. Persons having ordinary skill in the art will recognize that the straps 166 should be configured to quickly and efficiently secure the cover 142 to the patient transport apparatus 102. Other configurations are contemplated.

Figure 12:
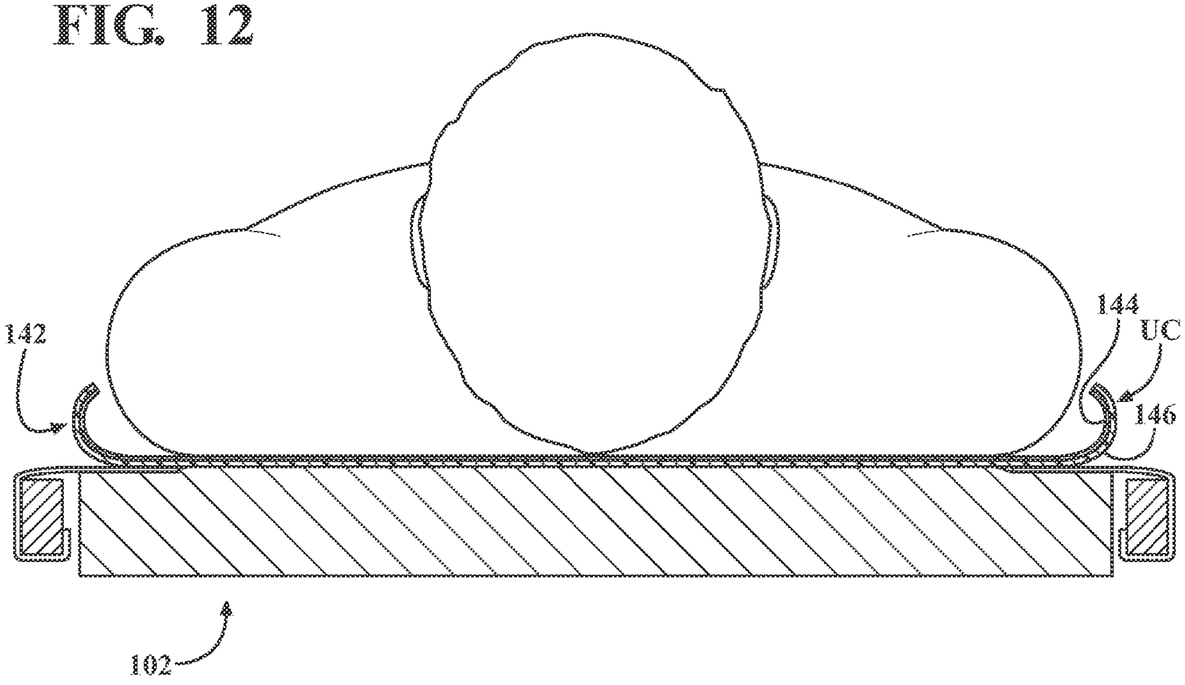
FIG. 12 is a partial rear view of an aspect of the protective system with a portion of the patient transport apparatus and cover shown in cross-section with the cover having the retainer including the elastic band to orient the periphery of the cover upward towards the patient for retaining fluid.
Figure 13:
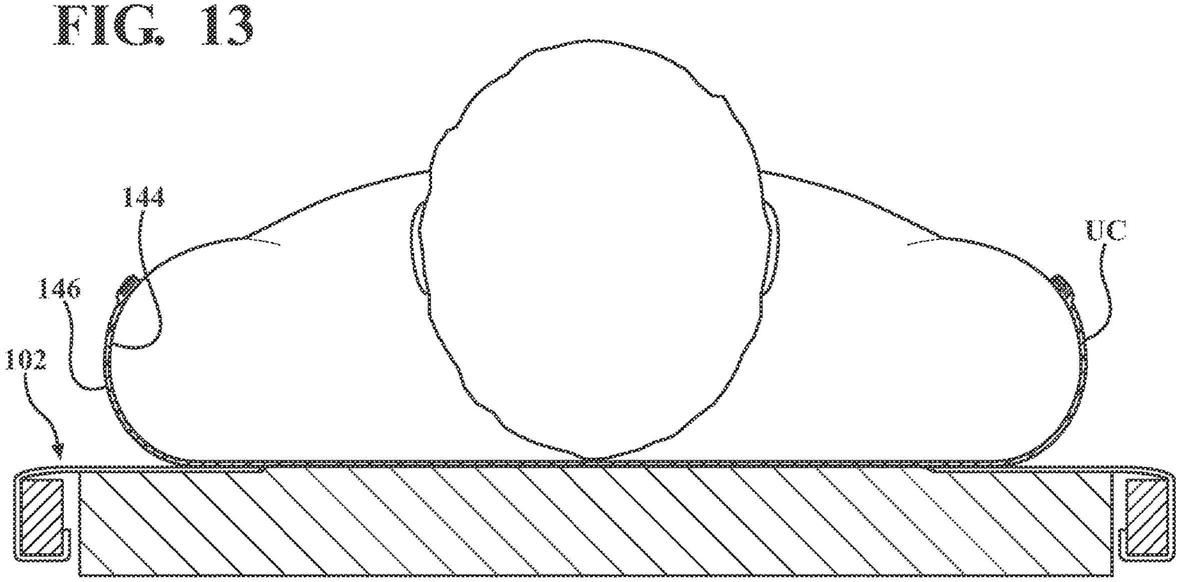
FIG. 13 is a partial rear view of an aspect of the protective system with a portion of the patient transport apparatus and cover shown in cross-section with the cover having the retainer including the band to at least partially cinch the cover around a portion of the patient.

As best shown in FIG. 12, when the cover 142 includes the lateral and/or perimeter bands 162, 164, the bands 162, 164 may bias or orient at least portions of the panel periphery 160 in an upwardly oriented configuration (UC). This upwardly oriented configuration (UC) may be particularly useful when the cover 142 is in the patient deployed position (PDP), because the configuration reduces the tendency that fluid will contact the cover 142 and merely transfer/run-off to the patient transport apparatus 102 due to gravity or movement of the patient transport apparatus 102. In addition, the upwardly oriented configuration (UC) of the panel periphery 160 may increase the utility of the second side 146 to absorb fluid by directing the fluid towards the second side 146. In one aspect, as best illustrated in FIG. 13, the lateral and/or perimeter bands 162, 164 of the retainer 158 may also be used to cinch the cover 142 to the patient. When the cover 142 is cinched to the patient, the tendency for fluid to contact the patient transport apparatus 102 is further reduced because the fluid is contained and/or adsorbed by the second side 146 of the cover 142 when the cover 142 is in the patient deployed position (PDP) or is contained within the cover 142 when the cover 142 is in the environmental deployed position (EDP). When included, the lateral and/or perimeter bands 162, 164 of the retainer 158 may be formed from any suitable material, such as an elastic polymer.

In an alternative aspect to cinching the cover 142 to the patient, as shown in FIG. 14, the cover 142 may include a pair of sleeves 168 extending from the periphery 160 of the panel 156. Each sleeve 168 may be configured or shaped to receive the lateral siderails 132 of the patient transport apparatus 102. The sleeves 168 may be used to secure the cover 142 to the patient transport apparatus 102 in either the environmental deployed position (EDP) or the patient deployed position (PDP). Although not required, the sleeves 168 are typically formed of the same material used to form the panel 156.

In other aspects, the cover 142 may be further defined as a first cover 142 that is removably coupled to a second cover 142' that is substantially the same as the first cover 142. For example, as best shown in FIG. 15, the first and second covers 142, 142' may be removably coupled at a perforated boundary 170 to facilitate separation of the first and second covers 142, 142'. Typically, in this configuration, the cover 142 is provided as a roll of covers 142 with cover 142 attached to an adjacent cover 142' at a perforated boundary 170. The roll of covers 142 may also facilitate the storage of the cover 142 within the keeper 140 in the stowed position (SP).

Referring back to the keeper 140, the keeper 140 may include a first compartment for stowing the cover 142 and further include a second compartment for stowing additional items. One example of an additional item that may be housed in the second compartment is a patient belonging bag 172. The patient belonging bag 172 may be used for storing the personal items of a patient. Typically, as shown in FIG. 16, the patient belonging bag 172 may include a labeling region 174 configured to receive a label written by a caregiver. Examples of the label include the name of the patient or another identifier to associate the contents within the patient belonging bag 172 with the actual patient. The other portions of the patient belonging bag 172 may be opaque to keep the contents of the patient belonging bag confidential to third parties. In certain aspects, two or more patient belonging bags 172 may be removably coupled from each other along a perforated boundary 170.

It is to be appreciated that the although the keeper 140 has been referred to throughout this disclosure as being the box-like container, the keeper 140 may have alternative configurations. For example, as shown in FIG. 2, the keeper 140 may be one or more securing straps. Alternatively, as shown in FIG. 3, the keeper 140 may be a bag with a draw string. It should also be appreciated that although FIGS. 1-3 show the keeper 140 coupled to the patient transport apparatus 102 in a particular location at the foot end 130 of the patient transport apparatus 102, the keeper 140 may be secured at other positions. For example, the keeper 140 may be secured at the foot end 130, but in a more discrete location such as an underside of the intermediate frame 108. It is also to be appreciated that the keeper 140 may not be drawn to scale in FIGS. 1-3.

The present disclosure also provides for a sensor system for facilitating the reordering of new covers 142 once the supply stored within the keeper 140 reaches a certain quantity. The sensor system can be configured in a number of ways. By non-limiting example, the sensor system may employ sensors, such as an optical sensor, to detect that the cover 142 has been removed from the keeper 140. In some configurations, the sensor system includes a detector configured to track an emitter attachable to the cover 142, whereby the detector is configured to sense positional changes of the emitter. The emitter is configured to generate a signal that is detectable by the detector to detect positional changes of the emitter. Suitable examples of the signal include near field communication NFC, radio frequency identification RFID, and the like. Other configurations are contemplated.

Several instances have been discussed in the foregoing description. However, the aspects discussed herein are not intended to be exhaustive or limit the disclosure to any particular form. Various modifications to these aspects will be readily apparent to those skilled in the art, and the generic principles defined herein may be applied to other aspects without departing from the scope of the disclosure. The terminology that has been used is intended to be in the nature of words of description rather than of limitation. Many modifications and variations are possible in light of the above teachings and the disclosure may be practiced otherwise than as specifically described.

What is claimed is:

1. A protective system for a patient transport apparatus, the protective system comprising:
- a patient transport apparatus including:
  - a base arranged for movement along floor surfaces;
  - an intermediate frame coupled to the base and supporting a patient support deck for supporting a patient; and
  - a mattress disposed on the patient support deck;
- a keeper coupled to the intermediate frame; and
- a cover for protecting the patient transport apparatus, the cover having a first side configured to absorb fluid and a second side opposite the first side and configured to at least partially limit fluid from transferring through the cover towards the first side, the cover being movable by a caregiver between:
  - a stowed position secured within the keeper;
  - an environmental deployed position defined by the cover spanning at least a portion of the mattress with the first side facing towards the mattress and the second side facing away from the mattress to at least partially limit fluid from transferring through the cover towards the mattress and prevent absorption of the fluid by the first side of the cover; and
  - a patient deployed position defined by the cover spanning at least a portion of the mattress with the first side facing away from the mattress and the second side facing towards the mattress for collecting fluid emitted by the patient.

2. The protective system of claim 1, wherein the cover further includes a panel defining the first side and the second side, and a retainer operatively attached to the panel and arranged to secure the cover to the patient transport apparatus in the environmental deployed position.

3. The protective system of claim 2, wherein the panel defines a panel periphery, and wherein the retainer is operatively attached to the panel periphery.

4. The protective system of claim 3, wherein the retainer comprises an elastic band to at least partially hold the cover around the mattress in the environmental deployed position.

5. The protective system of claim 2, wherein the retainer is further arranged to secure the cover to the patient transport apparatus in the patient deployed position.

6. The protective system of claim 5, wherein the retainer comprises a strap to secure the panel to the intermediate frame in the patient deployed position.

7. The protective system of claim 6, wherein the panel defines a panel periphery; and wherein the retainer is operatively attached to the panel periphery and comprises an elastic band to at least partially cinch the panel around a portion of the patient in the patient deployed position to retain fluid.

8. The protective system of claim 1, wherein the patient transport apparatus further includes a side rail operatively attached to the intermediate frame; and wherein the cover includes a sleeve shaped to receive the side rail in the patient deployed position to limit movement of the cover relative to the patient transport apparatus.

9. The protective system of claim 1, wherein the keeper includes a keeper body to secure the cover in the stowed position, and a limiter operatively attached to the keeper body and being operable between:

a limit mode to inhibit movement of the cover in the stowed position, and a deploy mode to permit movement of the cover in the stowed position.

10. The protective system of claim 9, wherein the limiter cooperates with the keeper body to limit exposure to the first side of the cover to fluids.

11. The protective system of claim 10, wherein the limiter is a lid configured to pivot about the keeper body.

12. The protective system of claim 3, wherein the retainer orients at least a portion of the periphery of the panel away from the mattress to collect fluid.

13. The protective system of claim 9, wherein the intermediate frame defines a head end and a foot end opposite the head end, and wherein the keeper is disposed about the foot end of the intermediate frame.

14. The protective system of claim 1, wherein the cover is further defined as a first cover and is removably coupled to a second cover in the stowed position that is substantially the same as the first cover.

15. The protective system of claim 14, wherein the first and second covers are removably coupled at a perforated boundary to facilitate separation of the first and second covers.

16. The protective system of claim 1, wherein the keeper is configured to stow the cover while in the stowed position and further configured to stow a storage container.

17. The protective system of claim 16, wherein the keeper includes a first compartment to stow the cover and a second compartment to stow the storage container.

18. The protective system of claim 17, wherein the storage container is further defined as a bag for storing personal belongings of a patient.

19. The protective system of claim 18, wherein the bag includes a region configured to allow the caregiver to label the bag.

20. The protective system of claim 19, wherein the bag is further defined as a first bag and is removable coupled to a second bag that is substantially the same as the first bag, and wherein the first and second bags are removably coupled at a perforated boundary to facilitate separation of the first and second bags.

* * * * *